United States Patent [19]

Yokoyama

[11] 4,218,252

[45] * Aug. 19, 1980

[54] INK COMPOSITIONS FOR CARBON PAPER

[75] Inventor: Nobuo Yokoyama, Yokohama, Japan

[73] Assignee: Nippon Oil Company, Ltd., Tokyo, Japan

[ * ] Notice: The portion of the term of this patent subsequent to Apr. 8, 1995, has been disclaimed.

[21] Appl. No.: 919,638

[22] Filed: Jun. 27, 1978

[30] Foreign Application Priority Data

Feb. 3, 1978 [JP] Japan .................................. 53-10555

[51] Int. Cl.$^2$ ...................... C09D 11/00; C09D 11/12
[52] U.S. Cl. ..................................... 106/31; 106/270; 106/271; 106/272
[58] Field of Search ....................... 106/270, 271–272, 106/31

[56] References Cited

U.S. PATENT DOCUMENTS

| | | | |
|---|---|---|---|
| 4,064,149 | 12/1977 | Rieger et al. | 260/406 |
| 4,082,558 | 4/1978 | Nobuo | 106/10 |

Primary Examiner—Carman J. Seccuro
Attorney, Agent, or Firm—Jordan and Hamburg

[57] ABSTRACT

An ink composition for carbon paper comprising a base oil, wax, carbon black, a dyestuff and filler, characterized by the fact that the wax contains a new wax prepared by reacting a specific polyolefin wax with an unsaturated polycarboxylic acid or the like to produce a reaction mixture, removing the unreacted acid or the like therefrom to obtain a modified wax, and then reacting the modified wax with a compound of a metal of Group II of the Periodic Table to convert the acidic groups of the modified wax to a salt of the Group II metal thereby obtaining the new wax.

8 Claims, No Drawings

INK COMPOSITIONS FOR CARBON PAPER

This invention relates to a novel ink composition for carbon paper. More particularly it relates to such an ink composition comprising a base oil, wax, carbon black and other necessary ingredients such as dyestuff and filler, the wax being such that at least a part thereof is a novel one having various excellent properties. The novel waxes according to this invention have excellent hardness, gloss, color tone and heat stability without any odor; when they are incorporated with the base oil, the resulting mixture will have excellent hardness, excellent gloss, satisfactory color tone, low viscosity and high oil retainability as well as excellent capability of dispersing carbon black, and excellent capability of dispersing dyestuffs and promoting color display thereof.

In general, inks for carbon paper comprise a base oil, wax and carbon black, as well as a dyestuff such as indigo or methyl violet, a filler such as powdered clay, a resin and the like as required. In the ink, the wax facilitates the mutual dispersion and combination of the other components, enables the ink to be applied to a paper substrate, prevents the base oil from blurring out to the back side of the paper substrate and also the base oil from transferring to other paper overlapped on the paper substrate for duplication, facilitates color development of the dyestuff and provides the ink applied to the paper substrate with gloss and smoothness; to this end, the wax may be used as the most important component in an amount of 20-60% by weight of the ink. It is not too much to say that the selection of an excellent single wax or an excellent combination of waxes is the key to production of an excellent ink for carbon paper.

The waxes presently used for this purpose are those which mainly contain natural wax such as carnauba or montan wax, or a modification thereof. Since these natural waxes and the modifications thereof have recently risen in price and raised problems as to their stable quality and reliable supply, many efforts have been made in attempts to synthesize waxes suitable for use in inks for carbon paper with the result that some synthesized waxes are used to some extent, but none of them are comparable to the natural waxes in every respect.

It is known that waxes usable for the purposes referred to herein should necessarily contain oxygen in the form of an ester group, acid group or the like. To this end, synthetic waxes may generally be oxidized themselves to introduce oxygen thereinto; however, such an oxidation method has not as yet produce satisfactorily high performance waxes, produces waxes having odor specific to oxidation products and/or having low heat stability due to degradation by oxidation and causes other disadvantages. In this manner, said oxidation method will necessarily involve the disadvantages caused by the oxidation. There is also known a specific method which introduces oxygen into waxes by reacting the wax with an unsaturated polycarboxylic acid typified by maleic anhydride or with an hydride or half ester of the unsaturated polycarboxylic acid; the waxes so obtained by this method are known to be suitable for use in inks for carbon paper (Japanese Patent Application Laying-Open Gazettes 10419/71 and 47685/76 for example). However, among the methods so laid open to public, one which uses natural wax as the starting material in the synthesis of wax by maleinisation (Japanese Patent Application Laying-Open Gazette 10419/71) should be essentially differentiated from those which are directed to production of substitutes for natural waxes.

The present inventors maleinised various polyolefin waxes by various methods and then treated the thus maleinised polyolefin waxes to effect secondary modification and reforming thereon, after which they found the thus treated waxes usable in the preparation of ink compositions for carbon paper. They further found that among the thus treated waxes, those prepared by maleinising a polyolefin wax under specific limited conditions and subjecting the thus maleinised wax to a specific secondary modification and reforming, exhibit particularly excellent properties, are comparable to natural waxes and surpass them in some respects. This invention is based on this finding or discovery.

It is known that an oxygen-containing polyolefin wax is obtained by reacting a polyolefin wax with an unsaturated polycarboxylic acid or anhydride thereof such as maleic anhydride, or a half ester thereof (the carboxylic reactant being hereinafter typified by "maleic anhydride" and the reaction hereinafter referred to as "maleinisation"). It is known that the maleinisation may be effected in two different ways; one is to mix a polyolefin wax with maleic anhydride and stir the resulting mixture at a temperature in the range of 200° to 300° C. thereby to cause a reaction of addition of maleic anhydride to the double bonds of the polyolefin wax; since, in this case, the amount of oxygen introduced into the polyolefin wax depends on the amount of double bonds contained in the polyolefin wax, it is necessary to use a polyolefin wax having many double bonds as the starting material in order to obtain a highly oxygen-containing polyolefin wax (maleinisation type I). The other is to effect the maleinisation even at a temperature of as low as not higher than 200° C. in the presence of an organic peroxide as an initiator, this being known; in this case, the extent of maleinisation does not depend on the amount of double bonds contained in a polyolefin wax used, and even a saturated hydrocarbon type wax such as paraffin wax may be maleinised (maleinisation type II). Comparing the maleinisation types I and II with each other, the present inventors have found that the wax obtained by maleinisation type I is excellent for use as a wax in ink compositions for carbon paper, while the wax obtained by maleinisation type II has been found defective in a few respects. Accordingly, the maleinisation which may be used in this invention should be limited to maleinisation type I.

There are known many methods for subjecting the thus obtained maleinised or firstly modified wax to secondary modification by reacting said maleinised wax with a second reactant. After the present inventors had tried to convert the acidic groups contained in the maleinised wax to various other groups such as ester, amide, imide groups or metal salts thereby to provide the wax with hardness and gloss which are desirable to a wax for use in ink compositions for carbon paper, they have found that the wax in which a part or the whole of the acidic groups of the maleinised wax has been converted to a salt of a metal, such as Ca, Mg or Zn, of Group II of the Periodic Table is particularly excellent in hardness and gloss and exhibits particularly excellent hardness and gloss when mixed with a base oil.

It is preferable that waxes for use in ink compositions for carbon paper be similar to natural waxes presently in use. Thus, the maleinised polyolefin waxes used herein may preferably have a melting point of 70°–120° C. and a number average molecular weight of 400–1,500. In cases where no peroxides are used as an initiator in the maleinisation, it is necessary that polyolefin waxes used herein as the starting material should contain 5–50 double bonds every 1,000 carbon atoms, such wax being hereinafter sometimes referred to as a "specific starting polyolefin wax".

The ink compositions for carbon paper comprise, as the feature, at least 5% by weight, based on the weight of the ink composition, of a new or final wax prepared by reacting 100 parts by weight of a specific starting polyolefin wax with 3–25 parts by weight of an unsaturated polycarboxylic acid, anhydride thereof or a half ester thereof under agitation at a temperature of 200°–280° C. to obtain a reaction mixture, treating the thus obtained reaction mixture to remove therefrom the unreacted unsaturated polycarboxylic acid, anhydride thereof or half ester thereof thereby obtaining a maleinised polyolefin wax and then reacting the thus obtained maleinised wax with a compound of a metal of Group II of Periodic Table in such an amount as to convert the acidic groups of the maleinised wax in an amount corresponding to 20–100% of acid equivalent indicated by said acidic groups to a salt of the metal of Group II of the Periodic Table thereby obtaining the new or final wax.

The wax contained in the ink composition of this invention may consist of the final wax alone or a mixture thereof with at least one other wax such as carnauba or montan wax.

The reason why the final wax, whether used alone or in admixture with at least one other wax, should be contained in an amount of at least 5% by weight of the ink composition is that the use of at least 5% by weight of the final wax in an ink composition for carbon paper will improve the ink composition in desirable properties such as gloss and reflectivity, while the use of less than 5% by weight thereof will be little effective in making such an improvement. The final or converted wax in the wax mixture may be present therein in an amount of up to 100% by weight thereof.

The general formulation of the ink compositions for carbon paper according to this invention is illustrated below.

| Base oil | 10–50 parts by weight |
|---|---|
| Wax or Waxes | 20–60 parts by weight |
| Carbon black | 5–25 parts by weight |

These ingredients are essential ones for the ink compositions. The ink compositions may be incorporated with a dyestuff as a color improver, a filler (such as powdered clay) as a hardness improver, a petroleum resin and a plastic material, each in a small amount (1–5 parts by weight for example); however, the filler which is inexpensive may be incorporated as an extender into the ink composition in a comparatively large amount (10–30 parts by weight for example) mainly from the economical point of view. In addition, in many cases, the wax used in the ink composition may be a mixture of two, three or more kinds of waxes to provide the ink composition with better properties and/or for the economical reason.

The preferable starting polyolefin waxes for the final wax used in the ink compositions of this invention include, for example, ethylene or propylene homopolymers and olefin copolymers containing ethylene or propylene as one of structural units.

The unsaturated polycarboxylic acids used for the production of the maleinised waxes according to this invention may preferably include maleic, fumaric, itaconic and citraconic acids, and mixtures thereof, as well as anhydrides of these acids. They may preferably further include monomethyl, monoethyl, monoisopropyl and like half-esters of said unsaturated polycarboxylic acids.

To remove the unreacted unsaturated polycarboxylic acids, anhydrides thereof or half-esters thereof from the reaction mixture obtained by the maleinisation as previously mentioned, there may preferably be employed a purging method comprising blowing nitrogen gas at atmospheric pressure into the reaction mixture at 140°–280° C. and a reduced-pressure distillation method comprising maintaining the reaction mixture at a reduced pressure lower than atmospheric pressure with or without being accompanied with blowing of nitrogen gas into the reaction mixture.

As an example of the starting polyolefin wax usable in the preparation of ink compositions of this invention, there was provided an ethylene polymer having a melting point of 87° C., an average molecular weight of 560 and 16 double bonds per 1000 carbon atoms contained in the polymer. One hundred (100) parts by weight of said ethylene polymer were incorporated with 12 parts by weight of maleic anhydride, and the resulting mixture was agitated in an autoclave at 235° C. for 6 hours to obtain a reaction mixture which was distilled at a reduced pressure for 3 hours to remove the unreacted maleic anhydride therefrom thereby obtaining an yellowish-brown maleinised wax having a saponification value of 83. The starting wax was a soft one having a penetration of 15, while the maleinised wax so obtained had a penetration of 9 which did still not indicate satisfactory hardness. The maleinised wax was incorporated with a lubricating oil (Nisseki Himotor—MS 30) having a SAE viscosity number of 30 as the base oil in a ratio by weight of 1:1 to form a mixture which was mixed under heat and then allowed to stand for cooling thereby to obtain a mixture having a penetration of 64 and no gloss appreciated on the surface thereof, the mixture so obtained being unsatisfactory in hardness and gloss which were required in a wax for ink compositions for carbon paper.

However, 100 parts by weight of the aforesaid maleinised wax were melted at 150° C. under agitation while dropwise adding to the melted wax 8 parts by weight of a 30 wt.% aqueous solution of $CaCl_2$ (specific gravity, 1.28) over a period of time of 1.5 hours, after which the resulting mixture allowed $N_2$ gas to be blown thereinto and then distilled at a reduced pressure thereby obtaining a final hard wax having a metallic gloss and a penetration of 1. A mixture consisting of the final wax so obtained and the same base oil as mentioned above in a ratio of 1:1 exhibited a penetration of 24 which was comparable to a penetration of 23 of carnauba wax and, when coated on thick paper, it exhibited attractive gloss and a 60° reflectively of 88% which was comparable to a gloss of 91% modified montan wax modified by processing (Hoechst OP). The mixture was placed and kept at 50° C. on thin chit paper to find how it would not blur out on the chit paper with the result that it is somewhat inferior in this respect to carnauba wax having very satisfactory oil retainability, but is equal to the Hoechst OP. Carbon paper prepared by using the final wax according to this invention alone as the wax component was a high-quality one having satisfactory gloss on the surface and was superior to commercially available one-time carbon paper in clearness of letters copied and capability of repetition of copying.

In addition, a wax prepared by incorporating carnauba wax with the final wax according to this invention is an amount of 10% by weight thereof and then mixing the resulting wax mixture with the base oil in a ratio by weight of 1:1, exhibited a 60° reflectivity of 41% when coated on thick paper, this clearly indicating that the reflectivity obtainable by the use of carnauba wax alone was 33% improved.

Further, as is apparent from many properties found in the Examples to be described later, the final waxes according to this invention have the properties required in a wax for use in an ink composition for carbon paper, are comparable to conventional, expensive natural waxes or modified ones and surpass these conventional waxes in some respects. They may be used alone or they may be added to other currently used waxes in an amount of at least 5% by weight thereof to improve the other waxes in properties.

It is known that the maleinised waxes may be secondarily modified and reformed by being converted to an ester, amide, imide or the like; these secondarily treated waxes may be used as such for carbon paper, but they are not comparable to the maleinised waxes in which the acidic groups have been converted to a calcium salt. Although the maleinised waxes may also be converted to a satisfactory final wax by treating with a compound of Mg or Zn, the treatment with a compound of Ca is the best since, for example, the maleinised wax treated with the Zn compound is colored reddish-brown.

There are considered many methods by which a part or the whole of the acidic groups of the maleinised wax is converted to a calcium salt, and the waxes so obtained by any one of these methods are an equally satisfactory one for use in an ink composition for carbon paper.

In a case where the maleinised wax in molten state is incorporated dropwise with an aqueous solution of $CaCl_2$ as previously mentioned, the reaction proceeds smoothly and quantitatively, accompanied by the evaporation of the water and HCl. This is also true with an aqueous solution of calcium acetate; however, in this case, more water must be volatilized since the solution used must be in a concentration of not higher than 20 wt.% because of low solubility of calcium acetate in water at ambient temperature, this being economically disadvantageous.

Even if the maleinised wax is incorporated with powdered CaO, $Ca(OH)_2$ or like material and then heated under agitation, no reaction will take place before the temperature is raised to higher than 300° C. If, however, a small amount of LiCl is added to this reaction system, the reaction will proceed in such a manner that it does not quantitatively complete while white-colored powder necessarily remains in the system after the completion of the reaction, thereby necessitating a step of removing the powder from the system.

When a system consisting of the maleinised wax incorporated with CaO, $Ca(OH)_2$ or the like in powder form is incorporated with water, an aqueous solution of HCl or the like, the reaction will proceed well even at about 150° C. Since, however, vigorous foaming occurs during the reaction in this system, it is necessary to establish a satisfactory measure against the foaming. In a similar system containing powdered $CaCO_3$ as the metal compound, and an aqueous solution of HCl, the reaction will likewise proceed.

The maleinised waxes wherein a part or the whole of the acidic groups has been converted to the calcium salt, that is, the final waxes have excellent hardness, gloss and color tone as well as no odor, low melting point and melt viscosity for their hardness, and excellent heat stability. Further, when the final waxes are incorporated with the base oil, the resulting mixture will have excellent hardness, excellent gloss, satisfactory color, low viscosity, high oil retainability as well as excellent capability of dispersing carbon black, and capability of dispersing dyestuffs and promoting color display thereof. Thus, the final waxes are suitable for use in an ink composition for carbon paper and their properties thereof mentioned above suggest that they are also suitable for use in an oily polish such as shoe polish and car wax, for use as an additive to plastics material and for many other purposes.

This invention will be further explained by reference to the comparative examples and non-limitative working examples.

COMPARATIVE EXAMPLE 1

A 5-liter autoclave was charged with 0.4 Kg of maleic anhydride and 3.3 Kg of a waxy low polymer of ethylene having a number average molecular weight of 560 (determined by ebulliometry), 16 double bonds per 1,000 carbon atoms with 92%, 3% and 5% of the double bonds being internal double bonds, terminal vinyl groups and terminal vinylidene groups, respectively, and also having a melting point of 87° C. (ASTM D-127) and a penetration of 15 (ASTM D-1321). The autoclave so charged was closed and thoroughly purged with $N_2$, after which the materials charged in the autoclave were heated to 235° C. with agitation in 3 hours and maintained at this temperature under agitation for another 3 hours. Thereafter, the resulting reaction mixture was allowed to cool and was then freed from the unreacted maleic anhydride by distillation-off thereof at an adjusted pressure of 5 mmHg under a slight $N_2$ gas stream thereby obtaining a maleinised or firstly modified wax as the product. The distillation was terminated when the reaction mixture decreased in temperature to about 150° C. in 3 hours, and the product was recovered. The properties of the starting material and the product are indicated in Table 1.

COMPARATIVE EXAMPLE 2

A copolymer of 93% ethylene and 7% propylene, having the same number average molecular weight and double bonds as the starting polymer used in Comparative example 1 was subjected to maleinisation in quite the same manner as in Comparative example 1. The properties of the starting material and the product are shown in Table 1.

COMPARATIVE EXAMPLE 3

A 5-liter flask was charged with 0.3 Kg of maleic anhydride and 2.5 Kg of a waxy ethylene polymer (produced under the tradename of Dialene produced by Mitsubishi Kasei Co., Ltd.) having a number average molecular weight of 460, a melting point of 80° C., a penetration of 11 and 32 double bonds per 1,000 carbon atoms with 4%, 78% and 18% of the double bonds being internal double bonds, terminal vinyl groups and terminal vinylidene groups, respectively. The flask so charged was purged with $N_2$ gas, fitted with a water-cooled condenser and heated under agitation. Refluxing of the maleic anhydride started when the materials in the flask were raised in temperature from ambient to 200° C., the heating was weakened at this point while the materials continued to rise gradually in temperature, the refluxing was terminated and the materials rose in temperature to 250° C. in about one hour. Thereafter, the materials were maintained at 250° C. under agitation for one hour, allowed to cool under a $N_2$ gas stream, distilled at a reduced pressure of 5 mmHg to remove therefrom the unreacted maleic anhydride and then filtered under pressure with a filter paper having about 3-$\mu$ diameter pores to remove therefrom the colored by-products. The starting material and the product are shown in Table 1.

COMPARATIVE EXAMPLE 4

A 2-liter flask was charged with 0.12 Kg of maleic anhydride and 1 Kg of the same starting polymer as used in Comparative example 3, purged with $N_2$ gas and fitted with a water-cooled condenser. The materials so charged in the flask were incorporated dropwise with a solution of 10 g DTBP (ditertiary-butyl peroxide) in 50 cc xylene in half an hour while heating to 150° C. under agitation, and the whole then continued to be agitated for another half an hour. Thereafter, $N_2$ gas was blown into the flask at 150° C., and the resulting reaction mixture in the flask was distilled at a reduced pressure of 5 mmHg to remove therefrom the volatile matter and then filtered under pressure with a filter paper having pores of about 3$\mu$ in diameter. The properties of the product obtained are indicated in Table 1.

COMPARATIVE EXAMPLE 5

3.2 Kg of the same product as produced in Comparative example 1 were incorporated with 0.16 Kg of ethylene glycol to form a mixture which was agitated at 150° C. for two hours and then distilled at a reduced pressure of 5 mmHg to remove therefrom the volatile matter thereby obtaining a final product. The properties of the final product are shown in Table 1.

COMPARATIVE EXAMPLE 6

Three (3) Kg of the same product as obtained in Comparative example 1 were heated to 130° C. under agitation and incorporated dropwise with 80 cc of ethylene diamine in 1.5 hours. The reaction was somewhat exothermic. The resulting mixture was further agitated for 0.5 hours and then freed from the volatile matter by blowing $N_2$ gas thereinto for one hour. The final product obtained had the properties as shown in Table 1.

COMPARATIVE EXAMPLE 7

Two hundred (200) grams of the same product as obtained in Comparative example 4 were heated to 150° C. under agitation and incorporated dropwise with 36 cc of a 30 wt.% aqueous solution of $CaCl_2$ in one hour. The saponification reaction proceeded, accompanied with volatilization of the water and HCl.

On completion of the incorporation of the $CaCl_2$ solution, $N_2$ gas was blown into the reaction system for 30 minutes and the reaction mixture was distilled at a reduced pressure of 5 mmHg to remove therefrom the volatile matter. The reaction condition intended was such that if the reaction had been perfectly completed, the whole of the acidic groups contained in the wax would have been converted to the Ca salt; however, after the end of the reaction, the product was somewhat white turbid. Thus, the product obtained was filtered under pressure with a filter paper having pores of about 3$\mu$ in diameter. The infra-red absorption spectrum of the product indicated that about 25% of the acidic groups had been converted to the Ca salt. The properties of the final product obtained are shown in Table 1.

COMPARATIVE EXAMPLE 8

Two hundred (200) grams of the same product as produced in Comparative example 1 were incorporated with 11 g of powdered $Ca(OH)_2$ to form a mixture which was agitated at 275° C. for 8 hours. This reaction condition intended was such that if the reaction had been perfectly completed, the whole of the acidic groups contained in the wax would have been converted to the Ca salt. However, white-colored powder precipitated at the bottom of the system when the agitation was stopped, and the infra-red absorption spectrum of the final product obtained indicated that the saponification reaction hardly proceeded.

EXAMPLE 1

3.7 Kg of the same product as produced in Comparative example 1 were heated to 150° C. under agitation, incorporated dropwise with 230 cc of a 30 wt.% aqueous solution of $CaCl_2$ in 1.5 hours and further agitated for 30 minutes. Thereafter, $N_2$ was blown into the system for 30 minutes and the reaction mixture was subjected to distillation at a reduced pressure of 5 mmHg for one hour to remove the volatile matter therefrom. This reaction condition intended was such that 25% of the acidic groups contained in the wax was converted to the Ca salt. After the end of the reaction, the final product obtained was so transparent as to need no filtration and the infra-red absorption spectrum indicated that the saponification took place as calculated. The properties of the final product obtained are shown in Table 1.

EXAMPLE 2

A maleinised wax was prepared in the same manner as in Comparative example 1. However, this wax had a saponification value of 85 and a number average molecular weight of 675. Fifty (50) grams of this product were heated to 150° C. under agitation, incorporated with 2.8 g of powdered $Ca(OH)_2$ and incorporated discontinuously and dropwise with a 1-N aqueous solution of HCl in two hours. The reaction proceeded, accompanied with considerably vigorous bubbling. Subsequent to the end of the incorporation of the HCl solution, $N_2$ gas was blown into the system for 30 minutes and the reaction mixture was distilled at a reduced pressure of 5 mmHg, thereby obtaining a final product. The reaction condition intended in this case such that the whole of the acidic groups contained in the starting wax was converted to the Ca salt, and the infra-red absorption spectrum indicated that the whole of the acidic groups had been so converted as calculated. In addition, the molecular weight of the final product found was in agreement with that calculated assuming that any two of all the molecules of the maleinised wax were crosslinked with Ca. The other properties of the final product obtained are shown in Table 1.

EXAMPLE 3

Using 200 g of the same starting product as obtained in Comparative example 1 and 26 cc of a 30 wt.% aqueous solution of $ZnCl_2$, the same reaction as in Example 1 was carried out. The reaction condition intended in this case was such that 50% of the acidic groups contained in the starting product was converted to the Zn salt. The final wax obtained was very hard with metallic gloss, but it was colored reddish-brown. The properties of the final product obtained are shown in Table 1.

EXAMPLE 4

The same reaction as in Comparative example 8 was effected at a lowered temperature of 200° and 3 cc of water was added discontinuously to the reaction system, whereby the reaction proceeded with vigorous bubbling. The addition of the water was effected in one hour, and the infra-red absorption spectrum indicated that the saponification reaction was substantially perfectly completed. The properties of the final product obtained are shown in Table 1.

EXAMPLE 5

The same product as obtained in Comparative example 2 was subjected to the same reaction as in Example 1. The final product obtained had the properties as shown in Table 1.

EXAMPLE 6

The product as obtained in Comparative example 3 was subjected to the same reaction as in Example 1. The properties of the final product obtained are shown in Table 1.

EXAMPLE 7

Various waxes as well as mixtures thereof with a base oil were tested for basic properties with the results being shown in comparison with each other in Tables 2, 3 and 4.

The base oil was a lubricating oil having a SAE viscosity number (produced under the tradename of Nisseki Himotor MS 30 by Nippon Oil Co., Ltd.) and was mixed with each of the waxes in the ratio by weight of 1:1. The resulting mixtures were thoroughly agitated at 120° C. and then used as the samples for the test.

As shown in Table 2, the properties of waxes of the Comparative examples and the Examples are approximate to those of carnauba wax or intermediate between the properties of carnauba wax and those of Hoechst OP. The Hoechst OP will not melt at about 90° C. because of its high melting point while, in comparison with this, the final wax according to this invention may be handled at a low temperature and has a low viscosity. The wax-base oil mixtures exhibit their specific hardness not necessarily depending on the inherent hardness of the wax used. The waxes in the Examples are all superior to the Hoechst OP and equal to the carnauba wax.

Although the samples could be well visually measured for gloss, they were coated on a gloss test paper (produced by Nippon Test Panel Industrial Co. Japan) and tested for their 60° reflectivity by the use of a gloss test apparatus (produced under the tradename of OH-1 TYPE by Toyo Rika Kogyo Co., Japan).

The waxes and wax-oil mixtures coated on the substrate are graded "very good ( )", "good (O)" or "bad (X)" by visual evaluation of the coating formed; the evaluation of such waxes and wax-oil mixtures may be varied when they form a coating. Among the controls, the Hoechst OP was excellent in gloss, but the carnauba wax did not exhibit gloss. The final waxes obtained in the Examples were substantially comparable to the Hoechst OP and exhibited gloss similar to that thereof. By adding 10% of the final wax obtained in Example 1 to carnauba wax, the carnauba wax will be improved in gloss and increased in reflectivity from the original 33% (prior to the addition of the final wax) to 41%.

The oil retainability indicates a performance by which the base oil is prevented from running on paper. Thus, it is an essentially important property for waxes for carbon paper.

The wax-oil mixtures were each formed into a cylinder having a diameter of 20 mm $\phi$ and a wall thickness of 10 mm (bottom area: 3.14 cm$^2$) and then placed on ten sheets of thin chit paper superposed one upon another, at 50° C. for three full days to find (1) the surface area of the uppermost paper over which the wax-oil mixture had run and to find (2) the number of sheets of chit paper through which the mixture had run down, the surface area portion and number of sheets found indicating the oil retainability (lower values (1) and (2) found indicating higher retainability). The values (1) and (2) are in relation to each other as shown in Table 4. The carnauba wax was very excellent in these respects, while the final wax according to this invention was not so excellent as the carnauba wax, but it was equal or superior to the Hoechst OP.

EXAMPLE 8

Using the final wax according to this invention, carbon paper was prepared in accordance with the following formulation:

| | |
|---|---|
| Base oil (Nisseki Himotors MS 30) | 200 g |
| Wax (as obtained in Example 6) | 48 g |
| Paraffin (Nisseki Paraffin 135° F.) | 80 g |
| Carbon black (Mitsubishi Kasei MA 100) | 68 g |
| Methyl violet | 4 g |
| | 400 g |

All the ingredients mentioned above were mixed together for one hour on a ball mill maintained at 120° C. to produce an ink composition which was coated on the back of thin chit paper with a roller coater to prepare carbon paper having the same quality as spot carbon paper.

The ink on the carbon paper was in the uniformly coated state, exhibited satisfactory gloss and did not stain or blot paper which was superposed on the carbon paper. Copying with the carbon paper could be repeated as many as four times, and the carbon paper was superior to commercially available carbon paper for use on the back of chit paper.

COMPARATIVE EXAMPLE 9

The procedure of Example 8 was followed except that carnauba No. 2 was substituted for the whole of the wax to produce an ink composition. Carbon paper prepared by using the ink composition so produced exhibited substantially the same performance as the carbon paper obtained in Example 8, but no surface gloss was appreciated on the ink coated.

EXAMPLE 9

In order to observe the state of dispersion of carbon black, each of the ink compositions for carbon paper obtained in Example 8 and Comparative example 9 was 15 times diluted with the base oil, and each of the diluted ink compositions was thoroughly mixed and placed in a test tube where it was allowed to stand at 120° C. for three full days. Thereafter, by the use of a squirt having a capillary tip, samples were taken out of the upper (surface), intermediate and lower (bottom) layers of the diluted ink compositions, respectively. The samples so taken were each placed on a slide glass, covered with a cover glass and visually observed by using a microscope capable of 600 magnifications, with the result that only fine carbon black particles were found in the samples taken out of the upper and intermediate layers while carbon black particles having a particle size of about 10μ in coagulation form were found in the samples taken out of the lower layer with the state of coagulation being somewhat more remarkable in Comparative example than in Example 8. From the foregoing, it was appreciated that the wax used in the ink composition of Example 8 had somewhat higher carbon black dispersion performance than the carnauba wax used in the ink composition of Comparative example 9.

EXAMPLE 10

In order to investigate the stability of waxes which were being worked or processed, heating tests were carried out. Various waxes were each precisely weighed out and then maintained at 150° C. for a fixed time to measure the weight loss thereof and observe the decree of discloration thereof.

As is seen from Table 5, the maleinised waxes and the secondarily modified or final waxes obtained in the Comparative examples and the Examples were all superior in heat stability to the natural wax, oxidized microwaxes, oxidized paraffin, oxidized polyethylenes etc. This tendency was found in the other heating tests at 170° C., 190° C. and 200° C.

In addition, the carnauba wax, oxidized microwaxes, oxidized paraffin and oxidized polyethylenes emitted their specific odors during the heating, respectively, while either the maleinised waxes or the final waxes obtained in Comparative examples and the Examples did not emit odors.

Table 1

| Wax | Description of wax | Properties of Waxes (including Starting Waxes and Controls) | | | | |
|---|---|---|---|---|---|---|
| | | Number average molecular weight (Ebulliometry) | Melting point (ASTM-D 127) | Penetration (ASTM-D 1321) | Saponification value (ASTM-D 1387) | Color (Gardner number ASTM-D 1544) |
| Carnauba wax No. 2 | Natural wax | 750 | 83 | 0 | 80 | 13 |
| Hoechst OP | Modified montan wax | Not measured | 99 | 1 | 105 | 11 |
| Comparative example 1 Starting wax | Ethylene polymer | 560 | 87 | 15 | 0 | 7 |
| Comparative example 1 | Maleinised | 645 | 88 | 9 | 83 | 11 |
| Comparative example 2 Starting wax | Ethylene-propylene copolymer | 560 | 83 | 25 | 0 | 7 |
| Comparative example 2 | Maleinised | 635 | 84 | 14 | 78 | 12 |
| Comparative example 3 Starting wax | Ethylene polymer | 460 | 80 | 11 | 0 | 1 |
| Comparative example 3 | Maleinised | 550 | 80 | 4 | 88 | 11 |
| Comparative example 4 | Peroxide maleinised | Not measured | 80 | 2.5 | 70 | 3 |
| Comparative example 5 | Ethylene glycol-modified | 1,030 | 89 | 3 | 76 | 11 |
| Comparative example 6 | Ethylene diamine-modified | 1,120 | 89 | 2 | 39 | 12 |
| Comparative example 7 | Partly saponified | Not measured | 81 | 1 | 63 | 3 |
| Example 1 | Partly saponified | 795 | 89 | 1 | 59 | 11 |
| Example 2 | Perfectly saponified | 1,410 | 90 | 1 | 46 | 11 |
| Example 3 | Zn-saponified | Not measured | 90 | 0 | 52 | >16 |
| Example 4 | Perfectly saponified | Not measured | 90 | 1 | 43 | 11 |
| Example 5 | Partly saponified | Not measured | 86 | 1 | 51 | 12 |
| Example 6 | Partly saponified | 690 | 82 | 2 | 73 | 11 |

Table 2

| Wax | Basic Properties of Waxes and Wax/Base Oil (1:1) Mixtures | | | | | | | |
|---|---|---|---|---|---|---|---|---|
| | Melting point (ASTM D-127) | | Density (90° C.) | | Viscosity (90° C.) | | Penetration ASTM D-1321 | |
| | Wax | Mixture | Wax g/cc | Mixture g/cc | Wax cp | Mixture cp | Wax | Mixture |
| (Base oil) | | | (0.94) | | (13) | | | |
| Carnauba No. 2 | 83° C. | 80° C. | 0.83 | 0.89 | 25 | 23 | 0 | 23 |
| Hoechst OP | 99 | 91 | Impossible to measure | Impossible to measure | Impossible to measure | ca. 95 | 1 | 33 |
| Comparative example 1 | 88 | 82 | 0.83 | 0.89 | 30 | 20 | 9 | 64 |
| Comparative example 3 | 80 | 76 | 0.84 | 0.89 | 24 | 17 | 4 | 58 |
| Comparative example 4 | 80 | 77 | 0.85 | 0.90 | 55 | 28 | 2.5 | 48 |

Table 2-continued

Basic Properties of Waxes and Wax/Base Oil (1:1) Mixtures

| Wax | Melting point (ASTM D-127) Wax | Melting point Mixture | Density (90° C.) Wax g/cc | Density Mixture g/cc | Viscosity (90° C.) Wax cp | Viscosity Mixture cp | Penetration ASTM D-1321 Wax | Penetration Mixture |
|---|---|---|---|---|---|---|---|---|
| Comparative example 5 | 89 | 80 | 0.84 | 0.89 | 75 | 32 | 3 | 56 |
| Comparative example 6 | 89 | 79 | 0.84 | 0.89 | 72 | 28 | 2 | 52 |
| Comparative example 7 | 81° C. | 77° C. | 0.86 | 0.90 | 93 | 42 | 1 | 38 |
| Example 1 | 89 | 83 | 0.84 | 0.89 | 110 | 32 | 1 | 24 |
| Example 3 | 90 | 86 | 0.85 | 0.90 | 130 | 46 | 0 | 22 |
| Example 4 | 90 | 86 | 0.86 | 0.90 | 125 | 36 | 0 | 21 |
| Example 6 | 82 | 77 | 0.85 | 0.89 | 73 | 24 | 2 | 21 |

Table 3

Gloss of Waxes and Wax-Base Oil (1:1) Mixture

| Wax | Wax alone Visual evaluation | Wax/Base oil Mixture Visual evaluation | Wax/Base oil Mixture 60° reflectivity |
|---|---|---|---|
| Carnauba No. 2 | O | O | 33% |
| Hoechst OP | O | O | 91 |
| Comparative example 1 | X | X | 17 |
| Comparative example 3 | X | X | 23 |
| Comparative example 4 | O | O | 46 |
| Comparative example 5 | O | X | 46 |
| Comparative example 6 | O | X | 42 |
| Comparative example 7 | O | O | 67 |
| Example 1 | O | O | 88 |
| Example 3 | O | O | 77 |
| Example 4 | O | O | 84 |
| Example 6 | O | O | 82 |
| Carnauba No. 2 9 Parts / Example 1 1 Part | O | O | 41 |

Table 4

Oil Retainability of Waxes

| Wax | Number of sheets of paper through which wax-oil mixture ran | Area of uppermost paper over which wax-oil mixture ran |
|---|---|---|
| Carnauba No. 2 | 1 | 0.8 |
| Hoechst OP | 3 | 12.6 |
| Comparative example 1 | 3 | 21.4 |
| Comparative example 3 | 3 | 17.7 |
| Comparative example 4 | 5 | 38.8 |
| Comparative example 5 | 6 | 37.2 |
| Comparative example 6 | 5 | 34.6 |
| Comparative example 7 | 5 | 33.0 |
| Example 1 | 3 | 11.1 |
| Example 3 | 2 | 9.8 |
| Example 4 | 2 | 8.9 |
| Example 6 | 3 | 14.9 |

Table 5

Heat Stability of Waxes (150° C. in air)

| Wax | Color | Weight loss in 4 hours | Weight loss in 8 hours | Discoloration in 8 hours |
|---|---|---|---|---|
| Carnauba No. 2 | Light brown | 0.80% | 1.14% | Black-brown |
| Hoechst OP | Light yellow | 1.21 | 2.56 | Brown |
| Oxidized microwax A | White | 2.17 | 3.84 | Yellow-brown |
| Oxidized paraffin B | Light yellow | 1.22 | 1.46 | Brown |
| Oxidized polyethylene C | White | 1.13 | 1.52 | Yellow-brown |
| Oxidized polyethylene D | White | 1.47 | 1.81 | Yellow-brown (Partly resinified) |
| Microwax 180° F. | Yellow | 0.03 | 0.03 | Yellow (No change) |
| Comparative example 1 Starting wax | Yellow | 0.09% | 0.20% | Yellow-brown |
| Comparative example 1 | Yellow-brown | 0.75 | 1.59 | Yellow-brown |
| Comparative example 3 Starting wax | White | 0.05 | 0.09 | Yellow-white |
| Comparative example 3 | Yellow-brown | 0.46 | 0.78 | Yellow-brown |
| Comparative example 5 | Brown | 0.89 | 1.20 | Brown |
| Comparative example 6 | Brown | 0.19 | 0.28 | Brown |
| Example 1 | Yellow-brown | 0.44 | 0.54 | Yellow-brown |
| Example 6 | Yellow-brown | 0.63 | 0.92 | Yellow-brown |

What is claimed is:

1. An ink composition for carbon paper comprising a base oil, wax, carbon black, a dyestuff and filler, characterized by the fact that the wax contains at least 5% by weight, based on the weight of the wax, of a final wax prepared by incorporating 100 parts by weight of a polyolefin wax having a melting point of 70°-120° C., a number average molecular weight of 400-1,500 and 5-50 double bonds per 1,000 carbon atoms with 3-25 parts of weight of a member selected from the group consisting of unsaturated polycarboxylic acids and the anhydrides and half esters thereof, reacting the resulting mixture at 200°-280° C. under agitation to produce a reaction mixture, treating the thus produced reaction mixture to remove therefrom the unreacted unsaturated polycarboxylic acid or the unreacted anhydride or half ester of unsaturated polycarboxylic acid thereby obtaining a firstly modified wax and then converting 20–100% of the acidic groups contained in the thus obtained firstly modified wax to a salt of a metal of Group II of the Periodic Table thereby obtaining the final wax.

2. An ink composition for carbon paper according to claim 1, wherein the polyolefin wax used in the preparation of the final wax is a member selected from the group consisting of ethylene homopolymers, propylene homopolymers, and copolymers of ethylene or propylene and at least one other olefin.

3. An ink composition for carbon paper according to claim 1 or 2, wherein the unsaturated polycarboxylic acids used in the preparation of the final wax are maleic, fumaric, itaconic and citraconic acids.

4. An ink composition for carbon paper according to claim 1 or 2, wherein the unsaturated polycarboxylic acid used in the preparation of the final wax is maleic acid.

5. An ink composition for carbon paper according to claims 1 or 2 wherein the half esters used in the preparation of the final wax are monomethyl, monoethyl and monoisopropyl esters.

6. An ink composition for carbon paper according to claims 1 or 2, wherein in the preparation of the final wax, the treatment to remove the unreacted unsaturated polycarboxylic acid or the unreacted anhydride or half ester of unsaturated polycarboxylic acid is achieved by a purging method comprising heating the reaction mixture to 140°–280° C. while blowing nitrogen gas at atmospheric pressure thereinto or by a reduced-pressure distillation method comprising maintaining the reaction mixture at a reduced pressure lower than atmospheric pressure together with or without blowing of nitrogen gas thereinto.

7. An ink composition for carbon paper according to claims 1 or 2, wherein the Group II metal used in converting the acidic groups to a salt is Ca, Mg or Zn.

8. An ink composition for carbon paper according to claims 1 or 2, wherein the Group II metal used in converting the acidic groups to a salt is Ca.

* * * * *